G. VON DER LINDE.
PROCESS OF OBTAINING THE TIN FROM WASTE TINNED METAL.
APPLICATION FILED MAY 6, 1914.
1,116,176.
Patented Nov. 3, 1914.
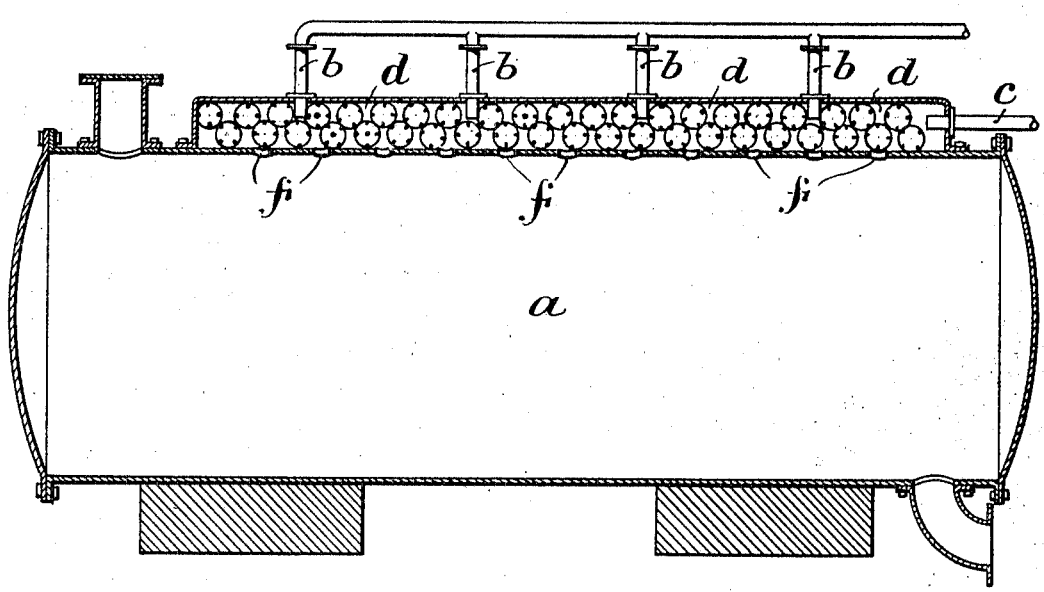

UNITED STATES PATENT OFFICE.

GUSTAV von der LINDE, OF ST. TÖNIS, NEAR CREFELD, GERMANY.

PROCESS OF OBTAINING THE TIN FROM WASTE TINNED METAL.

1,116,176.  Specification of Letters Patent.  Patented Nov. 3, 1914.

Application filed May 6, 1914. Serial No. 836,812.

*To all whom it may concern:*

Be it known that I, GUSTAV VON DER LINDE, manufacturer, a subject of the German Emperor, residing at St. Tönis, near Crefeld, Germany, have invented certain new and useful Improvements in Processes of Obtaining the Tin from Waste Tinned Metal; and I do hereby declare the following to be a full, clear, and exact description of the invention, such as will enable others skilled in the art to which it appertains to make and use the same.

My invention relates to improvements in a process of obtaining the tin from waste tinned metal. In recovering the tin from the tinned metal by means of chlorin much difficulty arises from the fact, that by the excessive heat produced by too strong action of the chlorin on the waste metal the metal is burned and the output reduced. To avoid this objection complicated apparatus have heretofore been provided such for example as apparatus for agitating the chlorin with air, and the like. Furthermore it has been suggested to use in the process mixtures of chlorin and air.

My invention is an improvement of the last named process.

It consists in producing a thorough and uniform mixture of a suitable concentration by means of a diffusion which is carried out in a special way, and thereafter causing the same to act on the waste tinned sheet iron. The diffusion is carried out in such a way, that the chlorin is passed into a chamber which is located before the reaction chamber and communicates therewith, and which is charged with distributing bodies filled with air for increasing the surface, such for example as Guttmann's hollow balls. The chlorin gas which enters into the said chamber flows rapidly around the air containing distributing bodies, so that by reason of the low molecular weight of the air the air diffuses vigorously into the vapor of chlorin so as to dilute the same. The mixture of air and chlorin which is thus obtained is uniformly distributed over the sheet metal for removing the tin therefrom, and which is located in the form of packages within an open receptacle having a sulfuric acid seal. By the reduction of pressure caused by the formation of tin chlorid air is drawn in through the sulfuric acid seal from the surrounding atmosphere. If the liquid seal is not directly connected to the reaction chamber, but to the chamber containing the distributing bodies, the air which has been drawn in will at once refill the distributing bodies, so that the process is repeated when chlorin is again admitted.

By the improved process a gaseous mixture is produced which is suitable for uniformly and completely removing the tin, and which prevents the waste metal from being burned.

The drying, chlorinating, and washing can be carried out within the same receptacle and without pressure.

In order that my improved process be more clearly understood an apparatus which is suitable for carrying the same is shown in the accompanying drawing, which shows a longitudinal section of the apparatus.

In the example shown in the drawing, the reaction is performed within a receptacle $a$ which is charged with the waste tinned sheet iron, and which communicates with a chamber $d$ through holes made in the wall of the receptacle $a$. The chamber $d$ is connected with supply pipes $b$ for the chlorin and with a pipe $c$ which is connected with the sulfuric acid seal. The chamber $d$ is charged with air filled distributing bodies, such for example as Guttmann's hollow balls $f$. The chlorin is intermittently supplied through the pipes $b$ from a suitable source, is mixed with the air of the distributing bodies so as to form a mixture of chlorin and air, and is finally admitted to the reaction chamber $a$. When the pressure within the latter is reduced by the reaction, air is drawn into the chamber $d$ through the pipe $c$, so that the distributing bodies are again filled with air.

I claim herein as my invention:

1. The herein described process of removing tin from tinned metals, which consists in producing a thorough and uniform mixture of air and chlorin by diffusion, and causing such mixture to act on the tinned metals.

2. The herein described process of removing tin from tinned metals, which consists in supplying chlorin to a chamber which is charged with air containing distributing bodies whereby the air is mixed with chlorin by diffusion, and supplying the mixture of chlorin and air which is thus obtained to a reaction chamber containing the tinned metal.

3. The process of removing tin from tinned metals, which consists in effecting a thorough and uniform mixture of air and chlorin in proper proportions, and causing such mixture to act on the tinned metals.

In testimony whereof I affixed my signature, in presence of two witnesses.

GUST von der LINDE.

Witnesses:
NOEL STEVENSON,
PAUL DREES.